United States Patent
Matsuki

(10) Patent No.: US 6,824,138 B2
(45) Date of Patent: Nov. 30, 2004

(54) GASKET

(75) Inventor: Katsunori Matsuki, Okayama (JP)

(73) Assignee: Uchiyama Manufacturing Corp., Okayama (JP)

( * ) Notice: Subject to any disclaimer, the term of this patent is extended or adjusted under 35 U.S.C. 154(b) by 0 days.

(21) Appl. No.: 10/314,255

(22) Filed: Dec. 9, 2002

(65) Prior Publication Data

US 2003/0107185 A1 Jun. 12, 2003

(30) Foreign Application Priority Data

Dec. 7, 2001 (JP) ........................................ 2001-373808

(51) Int. Cl.[7] ................................................ F02F 11/00
(52) U.S. Cl. ........................ 277/591; 277/648; 277/649; 277/598
(58) Field of Search ............................... 277/591, 598, 277/630, 637, 638, 641, 642, 644, 648, 649

(56) References Cited

U.S. PATENT DOCUMENTS

| | | | | |
|---|---|---|---|---|
| 4,192,520 A | * | 3/1980 | Hasegawa | ................... 277/591 |
| 4,501,432 A | * | 2/1985 | Kuniyoshi et al. | .......... 277/591 |
| 4,597,583 A | * | 7/1986 | Inciong et al. | ............... 277/591 |
| 4,819,953 A | * | 4/1989 | Joh | ............................. 277/591 |
| 5,536,018 A | * | 7/1996 | Szott | .......................... 277/313 |
| 6,065,757 A | * | 5/2000 | Schneider et al. | .......... 277/641 |
| 6,224,058 B1 | * | 5/2001 | Drebing et al. | .............. 277/313 |
| 6,523,833 B1 | * | 2/2003 | Ishigaki et al. | .............. 277/650 |

* cited by examiner

Primary Examiner—William L. Miller
(74) Attorney, Agent, or Firm—Wenderoth, Lind & Ponack, L.L.P.

(57) ABSTRACT

An elastic gasket is mounted to an annular groove on a seal surface of a cover member and used for sealing between the cover member and a block member closely attached to the seal surface. A transverse width of a cross section in a leading end side portion is smaller than a transverse width of a cross section in a bottom surface side portion continuously extending from a bottom surface side opposing the leading end side of the leading end side portion to a bottom surface side of the gasket. Each of the transverse width of the cross section in the leading end side portion and the bottom surface side portion has one magnitude all along a longitudinal direction thereof. A cross section of a transition region from the bottom surface side portion to the leading end side portion is in a step shape having a level difference.

2 Claims, 2 Drawing Sheets

GASKET

BACKGROUND OF THE INVENTION

1. Field of the Invention

The present invention relates to a sealing member (for example, a gasket) which seals between a cover member (for example, a cylinder head cover) in an engine mounted on a motor vehicle or the like and a corresponding member (for example, a cylinder head). Further, the present invention relates to a mounting structure between an annular groove provided on the cover member (for example, a cylinder head cover) and the sealing member (for example, the gasket).

2. Description of the Related Art

Conventionally, as a sealing member (for example, a gasket) which seals between a cover member such as a head cover, an intake manifold and the like of an engine mounted on a motor vehicle or the like, and a block member such as a cylinder head, a cylinder block and the like, there is employed an annular gasket formed by an elastic material such as a synthetic rubber, a cork, a synthetic resin and the like and having a rectangular or round cross sectional shape.

Upon mounting, when the conventional gasket as the before described is inserted from a leading end side of it into the annular groove provided on a seal surface of the cover member, a bottom surface side of the gasket opposing to the leading end side is exposed from the annular groove when said gasket is in a state in which most portions thereof are mounted within the annular groove.

Then, the corresponding member such as the cylinder head or the like is in contact with the exposed bottom portion of the gasket.

In this case, when fastening the cover member and the corresponding member by a fastening device such as a bolt or the like at a time of fastening, the gasket is compressed, and is elastically deformed so as to be closely attached strongly to each other, whereby a required sealing is achieved. This fastening is generally performed with a fastening torque about 5 to 10 Nm.

It has been difficult for the conventional gasket mentioned above to cope with requirements which are caused from a recent assembling operation using an automatic robot. In an assembling operation using an automatic robot, it is requested to prevent the gasket from coming off when it is mounted and from falling down when it is fastened. But, the conventional gasket mentioned above is difficult to cope with such requirements.

That is, corresponding to a recent requirement of weight saving, the gasket is formed in an O-ring shape having a narrow and vertically long cross section. When the gasket formed in this manner is intended to be mounted on to the annular groove provided on the seal surface of the cover member, it is difficult to mount the gasket on to the annular groove rapidly and easily, and it is difficult to mount the gasket securely in the annular groove of the cover member, because of the its narrow shape as the before described.

Further, when the gasket formed in the O-ring shape having the narrow and vertically long cross section mentioned above is mounted on the annular groove provided on the seal surface of the cover member, since it is formed in a vertically long shape, the said gasket is easily deformed in the outer portion of the annular groove, and easily falls down in a lateral direction so as to be fastened, at a time of being fastened.

In an engine assembling line, after the gasket is mounted on to the cover member, the cover member is reversed, and the fastening step between the cover member and the cylinder head or the like as mentioned above is conducted. So that, in the case that a means provided on the gasket for preventing the gasket from being dropped out is insufficient, there is a possibility that a seal defect may be caused by a dropout or displacement of the gasket. Further, a more serious damage may be caused depending on the dropout or displacement of the gasket.

Accordingly, it has been required to provide a gasket which is suitable for a work in a recent engine assembling line, so that it can be rapidly and easily mounted on the annular groove provided on the seal surface of the cover member as well as securely mounted on the said annular groove. Also, it has been required that by using the said gasket, any possibility of the before described falling down, dropout and displacement of the gasket can be eliminated.

And, it has been required to provide a mounting construction between an annular groove provided on the cover member (for example, a cylinder head cover) and the sealing member (for example, using the before described gasket).

In the recent engine assembling line, it is further required that the gasket is automatically mounted on to the annular groove provided on the cover member by using a mounting robot or the like, in further advance of the matter mentioned above.

However, since the gasket formed in the O-ring shape having the narrow and vertically long cross section as mentioned above is inferior in a shape maintaining property, the said gasket can not cope with the automatic mounting which is conducted in the recent engine assembling line mentioned above.

In Japanese Utility Model Application Laid-Open No. 2-31960, an annular gasket was proposed as it is suitable for a work in an engine assembling line. In FIG. 5, cross section of the gasket proposed by Japanese Utility Model Application Laid-Open No. 2-31960 is shown.

The gasket denoted by reference numeral 4 in FIG. 5 is formed such that an insert plate member 5 is inserted into a non-seal portion of a gasket main body, whereby it is intended to improve the shape maintaining property as well as increase a rigidity.

However, the gasket 4 can not achieve the other effective functions other than the increase of rigidity and the improvement of shape maintaining property. That is, even if an arrangement and/or a shape of the gasket 4 at a time of mounting and fastening is devised, a crack tends to be generated from an edge portion in which the insert plate member 5 is inserted, at a time when the gasket is compressed and deformed by fastening. Accordingly, there is a problem that the crack gives an adverse effect to the sealing property.

SUMMARY OF THE INVENTION

An object of the present invention is to provide a gasket which can be applied to an automatic mounting conducted in a recent engine assembling line mentioned above, and it can overcome the problems in the conventional gasket mentioned above. That is to say, the said gasket is required as it is suitable for a work in a recent engine assembling line. Further, it is required that, by using the said gasket, any possibility of the before described falling down, dropout and displacement of the gasket can be eliminated, and an improved sealing property is obtained.

The other object of the present invention is to provide a mounting construction between an annular groove provided on the cover member (for example, a cylinder head cover) and the before mentioned gasket.

In order to solve the problems mentioned above, the present invention proposes the following gasket.

A gasket according to the present invention is an elastic gasket which is mounted on to an annular groove provided on a seal surface of a cover member and is used for sealing between the said cover member and a block member closely attached to the seal surface of the said cover member.

In the gasket according to the present invention, a transverse width of a cross section in a leading end side portion inserted to the annular groove is made smaller than a transverse width of a cross section in a bottom surface side portion continuously extending from a bottom surface side opposing to the leading end side of the leading end side portion to a bottom surface side of the gasket.

In the gasket according to the present invention, the transverse width of the cross section in the leading end side portion has one magnitude all along the longitudinal direction of the leading end side portion, and the transverse width of the cross section in the bottom surface side portion has one magnitude all along the longitudinal direction of the bottom surface side portion.

That is, in the gasket according to the present invention, a cross section of a transition region from the bottom surface side portion to the leading end side portion is formed in a step shape having a level difference or level differences.

Further, in the gasket according to the present invention, a plurality of small projection portions and large projection portions each protruding from a side wall of the leading end side portion to a traverse direction of the gasket are provided in the leading end side portion at predetermined intervals respectively in a longitudinal direction of the gasket.

In the gasket according to the present invention described above, the large projection portions work as a means for preventing the gasket from being dropped out. That is, when mounting the gasket according to the present invention on to the annular groove provided on the seal surface of the cover member, the large projection portions are closely attached to inner side walls of the annular groove, and the gasket is securely mounted on to the annular groove. Accordingly, any possibilities of defective attachment, dropout or displacement of the gasket and the like can be eliminated.

Further, the small projection portions work as a means for preventing the gasket from being falling down. That is, at the fastening time when the cover member and the corresponding member are fastened by a fastening device such as a bolt or the like, the small projection portions are attached along inner side walls of the annular groove. Accordingly, the gasket is mounted within the annular groove with keeping a right and accurate attitude without falling down.

Since the gasket according to the present invention has a characteristic aspect mentioned above, the gasket is inserted toward the bottom portion side of the annular groove from the leading end side portion having the smaller transverse width of the cross section than that of the bottom surface side portion. Accordingly, the portion of the leading end side portion in which the large projection portions and the small projection portions are not arranged works as a so-called guide, and it is possible to smoothly and securely insert the gasket into the annular groove.

Further, as mentioned above, since the large projection portion, which works as the dropout preventing means, and the bottom surface side portion, which has a large transverse width of the cross section are inserted into the annular groove in succession to the leading end side portion and are closely attached to the inner side walls of the annular groove, the gasket is mounted within the annular groove in a state in which the risk of the defective attachment hardly exists.

Next, at the fastening time when the cover member and the corresponding member are fastened by the fastening device such as the bolt or the like, the leading end side portion of the gasket positioned in the bottom portion side of the annular groove first starts deforming, and when an amount of deformation comes close to an allowable amount, the deformation transits to the bottom surface side portion of the gasket, and the side walls of the bottom surface side portion is closely attached to the inner walls of the annular groove. That is, since the configurations of the before mentioned characteristic leading end side portion and the bottom surface side portion are provided, the gasket receives the compression, within the annular groove, step by step, and is deformed.

At this time, since the leading end side portion of the gasket positioned at the bottom portion side of the annular groove has the small transverse width of the cross section, the deformation of the large projection portions which is closely attached to the inner side walls of the annular groove at the threshold of starting the fastening process is dispersed. And then, the small projection portions are continuously closely attached to the inner side walls of the annular groove. When the small projection portions became closely attached to the inner side walls of the annular groove, the deformation also can be dispersed, since the leading end side portion of the gasket has small transverse width of the cross section.

Further, as mentioned above, when the side walls of the bottom surface side portion of the gasket become closely attached to the inner side walls of the annular groove according to the deformation transiting to the bottom surface side portion, the contact surface pressure in the leading end side portion and the bottom surface side portion of the gasket is kept uniform.

Further, in this fastening process, since the small projection portions, which works as a falling down preventing means, exist and the small projection portions are attached along the side walls of the annular groove as mentioned above, the gasket is mounted within the annular groove with keeping the right and accurate attitude without falling down.

As described above, the gasket according to the present invention can be smoothly and securely inserted and mounted on to the annular groove, and the mounting is free from the defective attachment such as the falling down, the insufficient insert and the like, and has no fear of dropout, displacement or the like.

Further, when the cover member and the corresponding member are fastened and closely attached according to the fastening process mentioned above, they are free from all the defective fastening such as compression deflection, a lateral flow, a defective deformation and the like. So that, it can keep a uniform and undistorted compression amount (closely attaching amount), and can achieve a strong and improved sealing property.

Accordingly, when using the gasket according to the present invention, it is possible to employ a robot for an automatically mounting operation or the like in the engine assembling line.

In the present invention, the characteristic aspects that the transverse widths of the cross sections of the leading end side portion and the bottom surface side portion in the gasket are respectively uniform all along the longitudinal direction thereof, and the cross section of the transition region from the bottom surface side portion to the leading end side portion in the gasket is formed in the step shape having the level difference, are adopted for receiving the compression, within the annular groove, step by step at the before mentioned fastening time.

Accordingly, not only an aspect that the cross section of the transition region from the bottom surface side portion to the leading end side portion in the gasket is formed in a step shape having one step, as illustrated in FIGS. 2 and 3, but also an aspect that the cross section of the transition region is formed in a step shape having a plurality of steps which is not illustrated also belongs to a technical field of the present invention.

According to the gasket of the present invention based on the aspect that the cross section of the transition region from the bottom surface side portion to the leading end side portion in the gasket is formed in the step shape having a plurality of steps, it is possible to receive the compression step by step and efficiently, within the annular groove, at plural times according to the said plurality of steps.

According to the shape of the gasket to be arranged and the required performance, it is possible to select and use the suitable aspect of the gasket among the before described two aspects (the one is that the cross section of the transition region from the bottom surface side portion to the leading end side portion in the gasket is formed in a step shape having one step, as illustrated in FIGS. 2 and 3, and the other is that the cross section is formed in a step shape having a plurality of steps).

The small projection portions and the large projection portions mentioned above can be arranged so that the small projection portions and the large projection portions are alternately arranged with a predetermined interval in the longitudinal direction of the annular gasket as illustrated in FIG. 4. Further, in addition to this, it is possible to employ various arrangement aspects according to the shape of the gasket to be arranged and the required performance. The various arrangement aspects include a type in which an aspect that one large projection portion is arranged after two small projection portions are continuously arranged is repeated in the longitudinal direction, a type in which an aspect that one large projection portion is arranged after three small projection portions are continuously arranged is repeated in the longitudinal direction of the gasket, a type in which an aspect that one small projection portion is arranged after two large projection portions are continuously arranged is repeated in the longitudinal direction of the gasket, and the like.

Further, based on their works and actions respectively achieved by the small projection portions and the large projection portions mentioned above, it is desirable that both of them are structured in an aspect that they protrude symmetrically from both opposite side walls of the leading end side portion of the gasket at the same position, as illustrated in FIG. 4. It is possible to employ the small projection portions and the large projection portions which project only from one sidewall of the leading end side portion in the gasket, according to the shape of the gasket to be arranged and the required performance.

The gasket according to the present invention can be formed by an elastic material, for example, can be formed by using a rubber material, a thermosetting elastomer, a resin material or the like.

In this case, as the rubber material, it is possible to employ a butyl rubber, a styrene-butadiene copolymer, an ethylene-vinyl acetate copolymer, an ethylene-methyl acrylate copolymer, an ethylene-ethyl acrylate copolymer, a butadiene rubber, a nitrile rubber, a hydrogenation nitrile rubber, an acrylic rubber, a silicon rubber, a fluorine-contained rubber, a phlorosilicon rubber, an ethylene propylene rubber, and the like.

Next, a mounting structure between the gasket and the annular groove provided on the seal surface of the cover member, which is proposed by the present invention to achieve the object mentioned above, is a mounting structure between the gasket according to the present invention described above and the annular groove provided on the seal surface of the cover member, in which the following characteristic aspects are provided.

According to a mounting structure of the present invention, in a cross sectional shape of the annular groove provided on the seal surface of the cover member, a transverse width of a bottom portion in the annular groove is not so different from a transverse width of an opening portion in the annular groove.

Also, in a mounting structure of the present invention, the transverse width of the cross section in a portion in which the large projection portions are arranged protruding to a transverse direction of the cross section of the gasket from both opposite side walls of the leading end side portion of the gasket is larger than the transverse width of the cross section in the annular groove.

Further, in a mounting structure of the present invention, the transverse width of the cross section in a portion in which the small projection portions are arranged protruding to a transverse direction of the cross section of the gasket from both opposite side walls of the leading end side portion of the gasket is smaller than the transverse width of the cross section in the annular groove.

Since the mounting structure between the gasket and the annular groove provided on the seal surface of the cover member is formed in the aspect mentioned above, the small projection portions and the large projection portions in the gasket of the before mentioned present invention can effectively achieve the before mentioned their actions and works.

That is, the gasket is smoothly and securely inserted and mounted on to the annular groove provided on the seal surface of the cover member because the portions in the leading end side portion of the gasket in which the large projection portions and the small projection portions are not arranged works as a so-called guide.

Further, since the transverse width of the cross section in the large projection portions, which works as a dropout preventing means is larger than the transverse width of the cross section in the annular groove, the large projection portions are closely attached to the side wall of the annular groove, and the gasket is mounted within the annular groove in a state in which there is hardly a fear of defective attachment.

At the fastening time when the cover member and the corresponding member are fastened by the fastening device such as the bolt or the like, there exists a lot of spaces between the leading end side portion of the gasket and the inner peripheral wall of the annular groove, in the bottom portion side of the annular groove, because the transverse width of the cross section in the small projection portions arranged in the leading end side portion of the gasket is smaller than the transverse width of the cross section in the annular groove. So that, according to the existence of the said spaces, at the threshold of starting the fastening process, the deformation of the large projection portions closely attached to the inner side wall of the annular groove can be dispersed, and even when the small projection portions are continuously closely attached to the inner side wall of the annular groove, the deformation thereof also can be dispersed. As a result, it is possible to make an internal stress within the gasket uniform, and it is possible to reduce stress relaxation so as to widely extend a seal service life.

In addition, it is possible to achieve all of the works and effects described with respect to the gasket according to the present invention mentioned above, it is possible to smoothly and securely insert and mount the gasket to the annular groove, and the gasket can be formed so as to be free from the defective attachment such as the falling down, the lack of insertion and the like, and have no fear of the dropout, the displacement and the like. Further, in the case of fastening and closely attaching the cover member and the corresponding member, the gasket can be free from all of the defective fastening such as the compression deflection, the lateral flow, the defect deformation and the like, it is possible to keep a compression amount (a closely attachment amount) which is uniform and has no deflection, and it is possible to achieve a strong sealing operation.

In the mounting structure between the gasket and the annular groove provided on the seal surface of the cover member according to the present invention, the before described configuration of the cross sectional shape of the annular groove provided on the seal surface of the cover member, in which the transverse width of the bottom portion in the annular groove is not so different from the transverse width of the opening portion in the annular groove, includes an aspect that the transverse width of the bottom portion in the annular groove is slightly larger than the transverse width of the opening portion in the annular groove or vice versa, in addition to the aspect that the transverse width of the opening portion in the annular groove is same as the transverse width of the bottom portion in the annular groove and both opposing inner side walls of the annular groove are arranged in parallel as illustrated in FIG. 1.

In the mounting structure between the gasket and the annular groove provided on the seal surface of the cover member according to the present invention, in order to preferably achieve the works and effects mentioned above, it is desirable that the transverse width of the cross section in the bottom surface side portion of the gasket is almost same or the same as the transverse width of the opening portion in the annular groove as illustrated in FIG. 1.

MODE FOR CARRYING OUT THE INVENTION

A description will be given below of a preferable embodiment according to the present invention with reference to the accompanying drawings.

An acrylic rubber is used as a synthetic rubber member, and an unvulcanized rubber is prepared by adding and mixing rubber chemicals to the acrylic rubber. This material is vulcanized and molded in a ring shape by using a mold, whereby a rubber gasket 3 according to the present invention is manufactured.

This gasket 3 is mounted onto an annular groove 11 provided on a seal surface of a cover member 1, and is used for sealing between a block member 2 and the cover member 1. In this sealing, a block member 2 is closely attached to the seal surface of the cover member 1.

A transverse width (a) of a cross section in a leading end side portion inserted into the annular groove 11 of the gasket 3 is made smaller than a transverse width (b) of a cross section in a bottom surface side portion (a lower side in FIGS. 1, 2 and 3), which is continuously extending to a bottom surface side of the gasket 3 from a bottom surface side opposing to a leading end side (an upper side in FIGS. 1, 2 and 3) of the leading end side portion.

Figure 1:
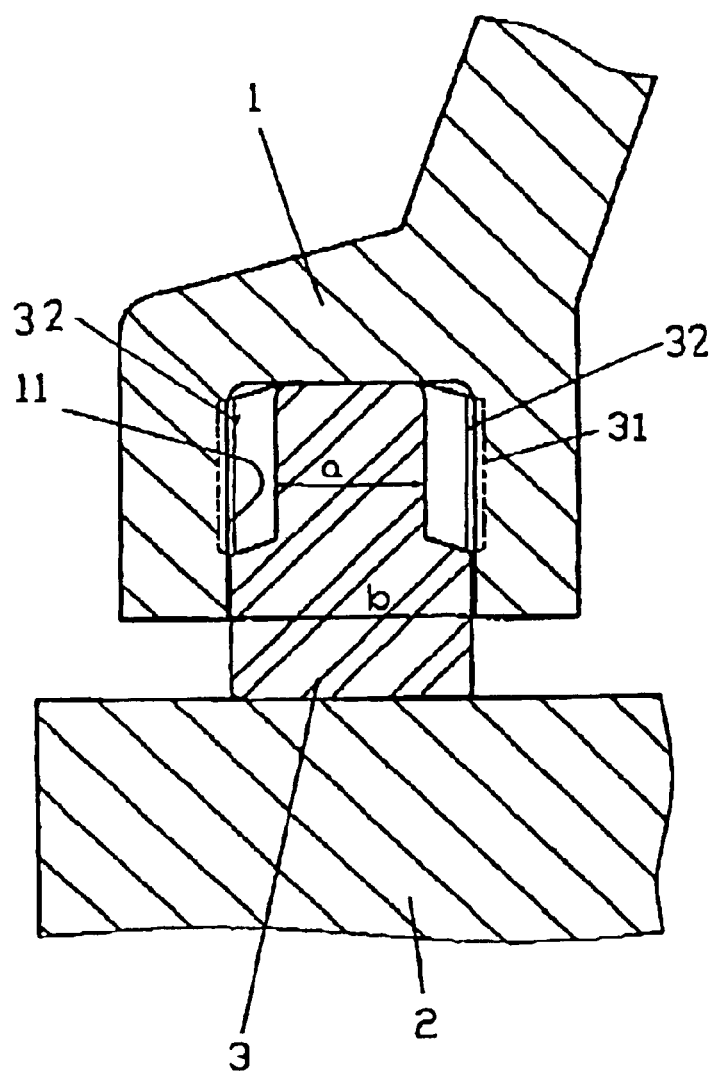
FIG. 1 is a cross sectional view which describes a preferable embodiment of a mounting structure between a gasket according to the present invention and an annular groove provided on a seal surface of a cover member.
Figure 2:
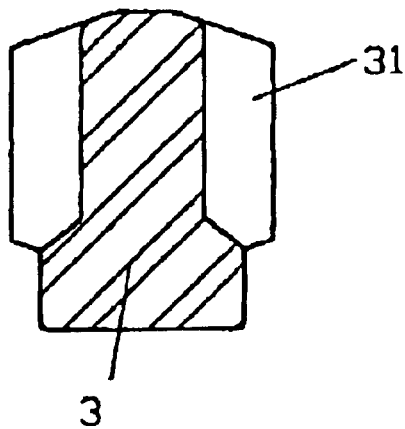
FIG. 2 is a cross sectional view of the gasket according to the present invention for describing a state in which large projection portions are arranged.
Figure 3:
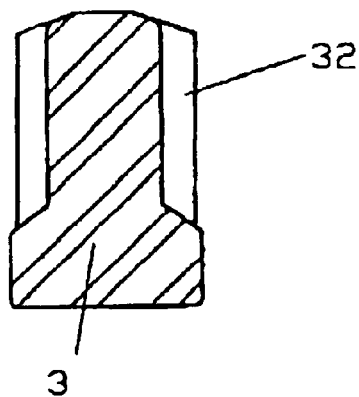
FIG. 3 is a cross sectional view of the gasket according to the present invention for describing a state in which small projection portions are arranged.

Further, each of the transverse width (a) of the cross section in the leading end side portion of the gasket 3 and the transverse width (b) of the cross section in the bottom surface side portion has one (constant) magnitude all along the longitudinal direction thereof, as illustrated in FIGS. 1, 2 and 3. Then, a cross section of a transition region from the bottom surface side portion of the gasket 3 to the leading end side portion is formed in a step shape having a level (constant) difference, as illustrated in FIGS. 1, 2 and 3.

Figure 4:
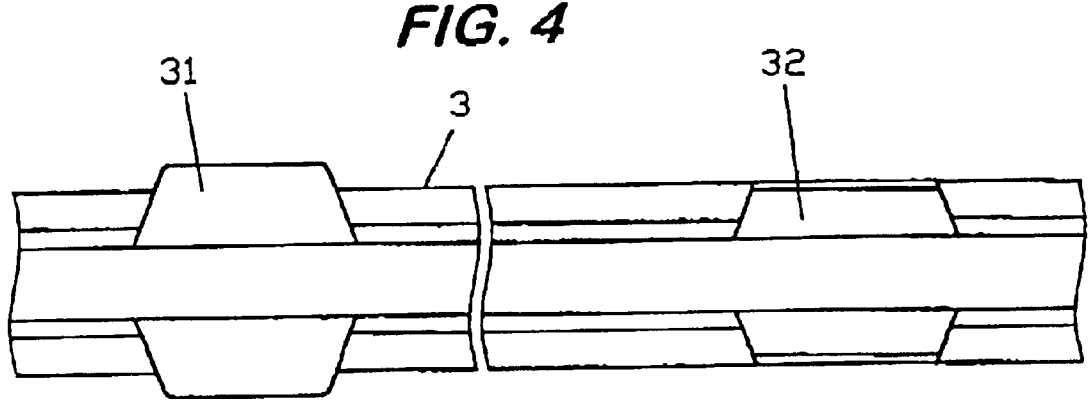
FIG. 4 is a plan view of the gasket according to the present invention in which a part of the gasket is omitted.
Figure 5:
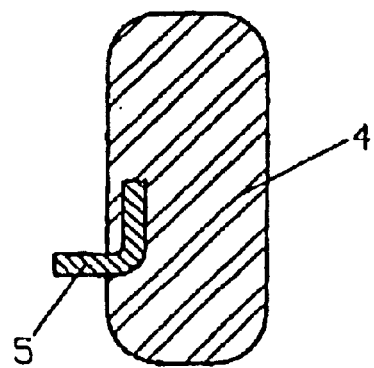
FIG. 5 is a cross sectional view of a gasket according to a conventional art.

Further, a plurality of small projection portions 32 and large projection portions 31 which protrude in a transverse direction of the cross section in the gasket 3 from a side wall of the leading end side portion, are respectively arranged in the leading end side portion of the gasket 3, as illustrated in FIGS. 2 and 3. These small and large projection portions 31 and 32 are arranged every predetermined intervals in a longitudinal direction of the gasket 3, as illustrated in FIG. 4.

FIG. 1 is a cross sectional view which describes a mounting structure according to the present invention between the gasket 3 of the present invention and the annular groove 11 provided on the seal surface of the cover member 1. There is shown a state in which the gasket 3 is inserted into the annular groove 11 from the leading end side portion thereof, and the leading end surface of the gasket 3 is brought into contact with the bottom surface of the annular groove 11, whereby the gasket 3 is attached to the annular groove 11.

In a cross sectional shape of the annular groove 11, a transverse width of a bottom portion (an upper side in FIG. 1) of the annular groove 11 is not so different from a transverse width of an opening portion (a lower side in FIG. 1) of the annular groove 11.

In the leading end side portion of the gasket 3, as illustrated in FIG. 1, a transverse width of a cross section in a portion in which the large projection portions 31 are arranged is larger than the transverse width of the cross section in the annular groove 11, and a transverse width of a cross section in a portion in which the small projection portions 32 are arranged is smaller than the transverse width of the cross section in the annular groove 11.

Firstly, the gasket 3 is mounted on to the annular groove 11 of the cover member 1. Then, the cover member 1 is reversed, and moving the cover member 1 close to the block member 2 as illustrated in FIG. 1, bringing the block member 2 into contact with the bottom surface of the gasket 3, and next, fastening the cover member 1 and the block member 2 by means of a bolt (not shown).

At this time, the gasket 3 does not drop out, displace and fall down, and it is possible to secure an improved sealing property.

A constitution, configuration and arrangement described in the before described preferred embodiments referring to the accompanying drawings are merely a general presentation for reasonable understanding of the invention. Therefore, it is to be understood that the invention is not limited to the forms disclosed in the before described embodiments, and that various modifications and variations may be made within the technical scope of the invention as set forth in the appended claims.

What is claimed is:

1. An elastic gasket which is mounted onto an annular groove provided on a seal surface of a cover member and is used for sealing between the cover member and a block member closely attached to the seal surface of the cover member, wherein a transverse width of a cross section in a leading end side portion of the gasket inserted to the annular groove is made smaller than a transverse width of a cross section in a bottom surface side portion continuously extending from a bottom surface side opposing to the leading end side of the leading end side portion to a bottom surface side of the gasket, each of the transverse width of the cross section in the leading end side portion and the bottom surface side portion is constant all along the longitudinal direction of the gasket, and a cross section of a transition region from the bottom surface side portion to the leading end side portion is formed in a step shape having a constant difference, and a plurality of small projection portions and large projection portions protruding to a transverse direction of the cross section of the gasket from a side wall of the leading end side portion are respectively arranged in the leading end side portion at predetermined intervals in the longitudinal direction of the gasket.

2. A mounting structure between the gasket according to claim 1 and the annular groove provided on the seal surface of the cover member, wherein, in a cross sectional shape of the annular groove, a transverse width of a bottom portion in the annular groove varies from a transverse width of an opening portion in the annular groove, wherein the transverse width of the cross section in a portion in which the large projection portions are arranged protruding to a transverse direction of the cross section of the gasket from both opposite side walls of the leading end side portion of the gasket is larger than the transverse width of the cross section in the annular groove, and wherein the transverse width of the cross section in a portion in which the small projection portions are arranged protruding to a transverse direction of the cross section of the gasket from both opposite side walls of the leading end side portion of the gasket is smaller than the transverse width of the cross section in the annular groove.

* * * * *